Nov. 23, 1937.
F. C. DOODY
2,100,243
AUXILIARY GLARE SHIELD
Filed March 9, 1937
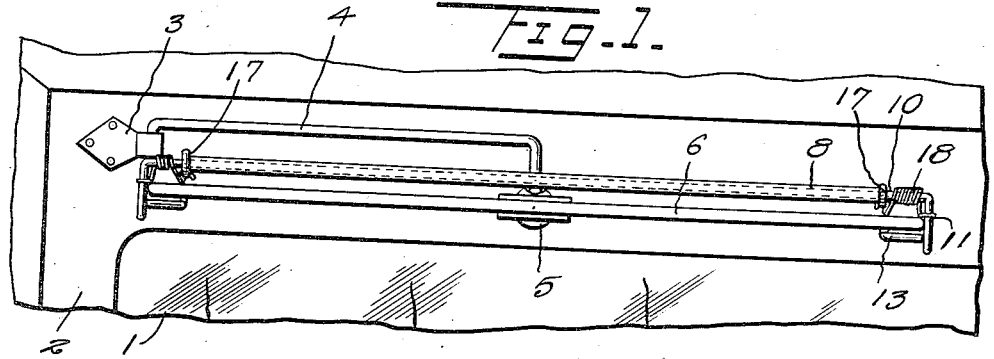
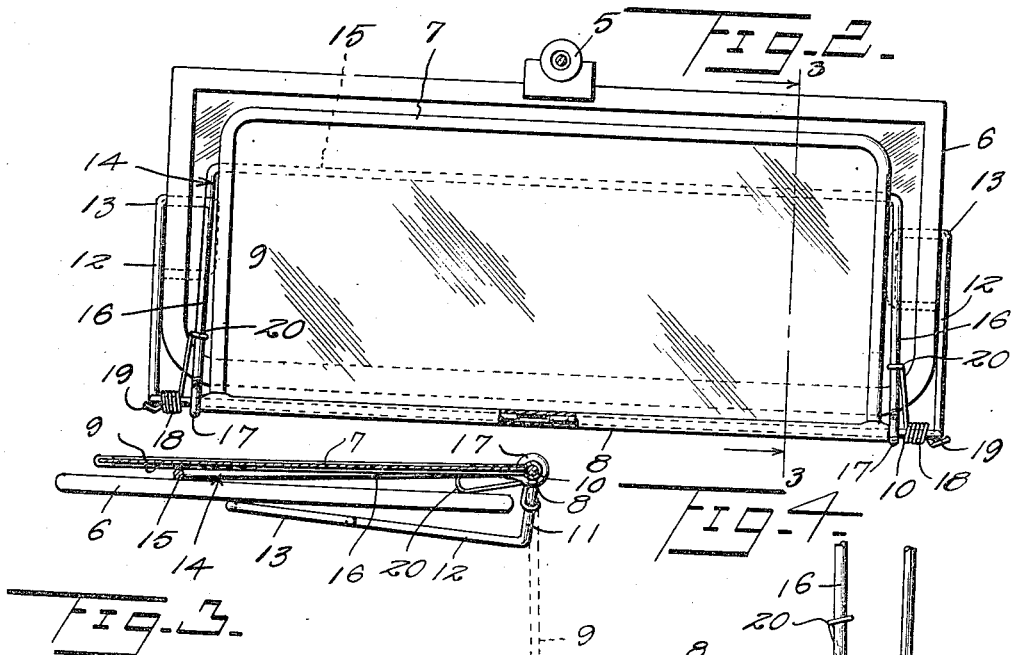
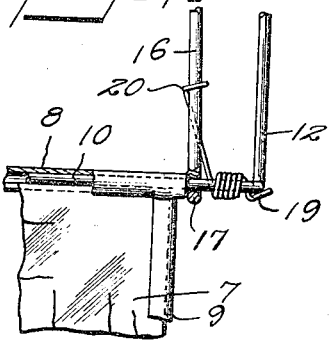
Inventor.
F. C. Doody
By Watson E. Coleman
Attorney Patented Nov. 23, 1937

2,100,243

UNITED STATES PATENT OFFICE 2,100,243

AUXILIARY GLARE SHIELD

Frederick C. Doody, St. Onge, S. Dak.

Application March 9, 1937, Serial No. 129,899

8 Claims. (Cl. 296—97)

This invention relates to automobile accessories and pertains particularly to a glare shield attachment for a motor or other vehicle.

The present invention has for its primary object to provide an improved glare shield which is so constructed that it may be readily attached to the glare shield forming a permanent or fixed part of a motor vehicle and may be moved into operative or inoperative position with the same or actuated independently of the motor vehicle shield, as may be desired.

Another object of the invention is to provide a glare shield attachment which when used in association with the permanent glare shield of a motor vehicle, can be employed as a map holding means or means for holding any other material which the driver of the vehicle may wish to observe from time to time while operating the vehicle.

A still further object of the invention is to provide a novel attachment of the character described having a novel means for clamping it in place upon the vehicle glare shield so that it may be readily shifted in its position or removed, as may be found desirable.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view of the interior upper forward part of a closed motor vehicle showing the usual permanent glare shield and the auxiliary shield constituting the present invention applied to the permanent shield.

Fig. 2 is a view in plan of the two connected shields.

Fig. 3 is a section taken on the line 3—3 of Fig. 2.

Fig. 4 is a detail view of one end of the hinge portion of the auxiliary glare shield.

Referring now more particularly to the drawing, the numeral 1 indicates the motor vehicle windshield mounted in the usual frame 2. At the top of the frame 2 upon the inner side is the usual bracket 3 to which is hingedly attached the arm 4 which carries upon its free end a ball (not shown) which is secured in a socket 5 which is fixed to the permanent glare shield 6. These elements are standard parts of a motor vehicle body and it is in association with the shield 6 that the present invention is used.

The device embodying the present invention comprises a frame 7 having a sleeve 8 formed along one side or forming one side of the frame, and within the frame is secured a suitable transparent material 9 of a desired color, such as amber, green, or the like. The sleeve 8 has inserted into each end a stub shaft 10 which forms an integral continuation of a right angularly directed arm portion 11 which in turn forms an integral part of a clamp arm 12 which terminates in the enlarged loop portion 13.

Oscillatably mounted upon the two stub shafts 10 is an open elongated frame, indicated generally by the numeral 14, and having the long side 15 and the short end portions or bars 16, each of which terminates in a hinge eye 17 through which a stub shaft 10 passes. The frame 14 constitutes a clamp frame which co-acts with the clamp arms 12 and this frame 14 is of slightly greater length than the glare shield 7 but is of less width than the same as shown in Fig. 2. The shield 7 is thus permitted limited swinging movement on the stub shafts 10 between the end bars 16 of this clamp frame, and the long bar of the frame stops the swinging of the glare shield when the shield and frame are brought into substantially the same planes.

Each of the stub shafts 10 has a coil spring encircling it as indicated at 18, and one leg 19 of each spring is hooked about the lateral extension or arm 11 of a clamp arm 12 while the other leg of each spring is hooked over the adjacent bar 16 as indicated at 20. The springs are so tensioned as to constantly tend to draw the clamp bars or arms 12 and the clamping frame 14 together, and the looped end portions 13 of the clamping arms engage the end bars 16 of the frame when there is no body interposed between them so as to prevent these parts separating in an indesirable manner.

When the glare shield is placed in use, the clamping arms 12 are moved away from the bars 16, so that the fixed glare shield may be inserted and thus when the bars 16 are released the springs 18 will draw the clamping parts together and thus securely grip the inserted fixed shield.

The auxiliary shield is placed on the fixed shield so that the sleeve-like side portion 8 of the auxiliary shield will lie slightly in front of the free edge of the fixed shield and thus the auxiliary shield may be swung in substantially a complete circle so that it can be brought into right angular relation with the fixed shield as illustrated in dotted outline in Fig. 3, or it may be swung rearwardly and upwardly to position over the top of the fixed shield, as is illustrated in this same figure and also in Figs. 1 and 2.

From the foregoing it will be readily apparent that with the present glare shield, a driver may operate his vehicle and still see the road ahead of him, as most fixed glare shields are of solid non-transparent material, and the present shield has the transparent insert or panel which permits the operator to run the machine without having his view of the road cut off. It will also be readily apparent that by moving the transparent panel of the auxiliary windshield against the top of the fixed windshield, a road map or other sheet of material which the operator of the car may wish to observe from time to time, can be securely held in place between the fixed shield and the auxiliary one, and the fixed shield tipped down sufficiently to allow the sheet to be seen without interfering with the driver's view of the road.

What is claimed, is:

1. A glare shield of the character set forth, comprising a rectangular shield body, a clamp frame having an open side in which one longitudinal edge of said shield body lies in longitudinal relation with the frame, means forming a pivotal connection between the ends of said shield edge and the adjacent parts of the frame, a pair of clamp arms each pivotally joined to an end of said frame and directed across the said end, and spring means normally tending to move said arms into abutting relation with the frame.

2. A glare shield of the character set forth comprising a rectangular shield body, a clamp frame having an open side in which one longitudinal edge of said shield body lies in longitudinal relation with the frame, means forming a pivotal connection between the ends of said shield edge and the adjacent parts of the frame, a clamp arm at each end of the frame and having a right-angularly related terminal portion pivotally coupled with the adjacent end of the frame whereby the arm may assume a spaced parallel relation with the frame, and a spring coupling each arm terminal portion with the frame and constantly urging the arm and frame into clamping relation.

3. A glare shield of the character set forth, comprising a rectangular shield body consisting of a frame having a transparent panel therein, said frame being formed at each end on one side edge to provide shaft receiving means directed longitudinally of the said side edge, shaft forming means lying in and projecting from said receiving means beyond the ends of the frame, a clamp arm at each end of the frame and secured at one end to the shaft forming means and extending in a direction transversely of the frame, a clamping frame having a long side disposed longitudinally of the shield body and short end bars lying transversely of the body, pivotal coupling means between the said end bars and the shaft forming means, and spring means coupling said arms with the adjacent clamping frame bars and constantly urging the arms and clamping bar together.

4. An auxiliary glare shield, comprising a clamping unit for securing the shield to a support and consisting of a frame having a long side bar and end bars and spring pressed clamping arms pivotally coupled with the frame at its ends and having co-acting clamping relation with the adjacent end bars, and a shield body oscillatably coupled with said unit to facilitate moving it into and from operative positions.

5. An auxiliary glare shield, comprising a clamping unit for securing the shield to a support and consisting of a frame having a longitudinal side bar and end bars and clamping arms pivotally coupled with the frame at its ends and having co-acting clamping relation with said end bars, a shield frame having hinge connection with the unit, and a transparent panel of material in the frame having the capacity to intercept undesirable light rays.

6. A glare shield of the character set forth, comprising an elongated rectangular frame having a glare reducing panel therein, said frame being formed along one long side to form an open-ended sleeve, a shaft extending from each end of and oscillatable in said sleeve and having a right-angular continuation terminating in a clamping arm having a right-angular relation with said continuation, an open clamping frame having one long bar and shorter angularly related end bars, each of said end bars terminating in a hinge eye through which a shaft extends, the clamping frame being oscillatable on said shafts, and spring means coupling the clamping arms and the clamping frame and normally urging the same into clamping relation.

7. An auxiliary glass shield for a vehicle glare shield, consisting of a clamping unit comprising a rectangular frame adapted to contact one side of the vehicle shield and including end bars, a pair of arms pivoted to an end bar and spring means urging the arms into clamping relation with the bars, the arms being adapted to contact the other side of the vehicle shield, and a shield pivotally connected to the unit to be moved selectively into parallelism with the vehicle shield or into a perpendicular relation therewith.

8. A glare shield of the character set forth, comprising a frame having a glare reducing panel therein, the frame having a side in the form of an open-ended sleeve, a shaft oscillatably mounted in each end of the sleeve and projecting therefrom in a right-angular terminal portion constituting a clamping arm, a pair of bars each oscillatably connected at one end with a shaft, and spring means coupling each bar with the adjacent arm to urge the same into clamping relation upon an interposed supporting body.

FREDERICK C. DOODY.